United States Patent [19]

Hoppenjans

[11] Patent Number: 4,894,988

[45] Date of Patent: Jan. 23, 1990

[54] HYDRAULIC SYSTEM FOR OPERATING SWITCHING OR LIKE DEVICES

[75] Inventor: Albert J. Hoppenjans, Belleville, Ill.

[73] Assignee: Turner Electric Corporation, Fairview Heights, Ill.

[21] Appl. No.: 205,571

[22] Filed: Jun. 8, 1988

Related U.S. Application Data

[63] Continuation of Ser. No. 917,786, Oct. 10, 1986, abandoned.

[51] Int. Cl.[4] .......................... H01H 3/24; H02B 5/02

[52] U.S. Cl. .......................................... 60/418; 91/31; 91/443; 91/448; 137/883; 307/112

[58] Field of Search ........................ 91/6, 31, 443, 448; 137/884, 883; 307/112; 60/418

[56] References Cited

U.S. PATENT DOCUMENTS

| | | | |
|---|---|---|---|
| 1,797,591 | 3/1931 | Sartakoff | 137/884 X |
| 2,634,751 | 4/1953 | Borer | 91/6 X |
| 3,038,449 | 6/1962 | Murphy et al. | 91/6 X |
| 3,243,958 | 4/1966 | Ruchser | 91/6 X |
| 3,635,020 | 1/1972 | Mahlman | 91/6 X |
| 4,167,200 | 9/1979 | Bouteille | 137/884 |
| 4,253,379 | 3/1981 | Olson | 137/884 X |
| 4,262,695 | 4/1981 | Iizumi | 91/443 X |
| 4,287,812 | 9/1981 | Iizumi | 91/443 X |
| 4,328,829 | 5/1982 | Stoll | 137/884 X |
| 4,335,867 | 6/1982 | Bihlmaier | 91/6 X |
| 4,348,942 | 9/1982 | Stoll | 137/884 X |
| 4,493,244 | 1/1985 | Stillfried et al. | 91/448 X |
| 4,640,311 | 2/1987 | Martinet et al. | 137/884 X |

FOREIGN PATENT DOCUMENTS

| | | | |
|---|---|---|---|
| 3227776 | 10/1983 | Fed. Rep. of Germany . | |
| 2251738 | 6/1975 | France | 91/448 |
| 1000616 | 3/1983 | U.S.S.R. | 91/31 |

OTHER PUBLICATIONS

Parker-Hannifin Corp., *Industrial Hydraulic Technology Bulletin* 0221-*B*1, Cleveland, Ohio: Parker-Hannifin Corp. (1985), p. 6-3.

Stewart, Harry L. et al., *ABC's of Hydraulic Circuits,* Indianapolis, Indiana: Howard W. Sams & Co. (1973), pp. 137-138.

Yeaple, F., *Fluid Power Design Handbook,* New York, New York: Marcel Dekker, Inc. (1984), pp. 70-76, 197.

"Integrated Fluid Circuit Manifolds and Modular Components," by Circle Seal Controls, Brunswick Corporation, 1983, p. 1.

*Primary Examiner*—Robert E. Garrett

*Assistant Examiner*—George Kapsalas

*Attorney, Agent, or Firm*—Haverstock, Garrett & Roberts

[57] ABSTRACT

A hydraulic control system for actuating a switch or related device including an actuator assembly having a housing with a member movable therein and connected to the switch for movement therewith between first and second positions responsive to the application of hydraulic pressure in the housing on opposite sides of the movable member. The hydraulic control system includes a block member having inlet and outlet ports and passageways therebetween, the inlet port being connected to a source of hydraulic pressure, a plurality of control devices mounted on the block member and selectively energizable for establishing communication between the inlet port and a selected one of the outlet ports, the outlet ports being connected to the actuator housing to communicate with the housing on opposite sides of the movable member, and hydraulic pressure restrictor devices mounted on the block member at positions to predeterminately restrict hydraulic communication between the inlet port and the selected one of the outlet ports to control the speed of movement of the movable member in the actuator housing.

14 Claims, 5 Drawing Sheets

HYDRAULIC SYSTEM FOR OPERATING SWITCHING OR LIKE DEVICES

This is a continuation of co-pending application Ser. No. 917,786 filed on Oct. 10, 1985, now abandoned.

BACKGROUND OF THE INVENTION

Switch actuator devices have been known heretofore and have been used for opening and closing switching circuits in devices such as high voltage power circuits and the like for maintenance and other reasons, and some of the known devices have included hydraulic actuating means. One of the more pertinent known prior constructions is disclosed in Turner et al. U.S. Pat. No. 4,117,678 issued Oct. 3, 1978 assigned to Applicant's assignee. This patented construction is a self-contained hydraulic switching device which is used for the same or similar purposes of the present construction. However, the known device is more limited than the present device, and is capable of being hydraulically actuated in one direction only so that movements in the opposite direction must be made manually or by means other than hydraulic actuation. Other limitations and shortcomings of the prior art include the numerous and more exposed hydraulic connections including the tubing and related members in their hydraulic systems which require more associated fittings and seals all of which present opportunities for potential trouble and leakage. Hydraulic tubing at best is fragile and easily damaged by environmental changes, vandalism and by being handled by unskilled or careless personnel. Other problems arise with the known prior art constructions because they are physically larger than the present device, require more space for installing, require relatively frequent maintenance, are more difficult to repair and maintain, are more difficult to tailor to a particular application, are relatively fragile, and are more difficult to service and adjust in the field. The prior art constructions are also more complicated structurally and operationally then the present device and require among other things the use of reversible motors. Prior art constructions which use reversible motors to operate switching means in both directions also require that the pump means driven by the motors be able to operate for both directions of motor rotation. The pumps in such systems operate in one direction to charge an accumulator and in the opposite direction to hydraulically operate an actuator. Unlike the prior art, the present construction can be operated by a motor capable of rotation in one direction only and yet is able to charge an accumulator whose output operates the hydraulic system in both directions. The requirement of having a reversible motor in the prior art systems complicates the construction of the hydraulic and electrical systems and makes for much more complex overall systems.

SUMMARY OF THE INVENTION

The present invention resides in a hydraulically actuated motor operated control device which has a unidirectional motor that drives a pump to charge an accumulator. The accumulator in the present system stores a charge that provides the energy for operating a bidirectional actuator which is able to move a switching device under control thereof between its open and its closed conditions. To this end the present construction includes a novel block type member which is rigid in construction and has provisions for accommodating most of the elements and connections of the hydraulic system. The block member has a plurality of orifices and passageways formed therein including inlet and outlet orifices and passageways and mounting means for check valves, solenoid controlled valves and various fitting and connections to the pump and accumulator devices. The accumulator is preferably connected directly to the block member as are the hydraulic lines that connect the system to the actuator. The subject device is operated in one direction to open and in the opposite direction to close a switching device, and the system is usually controlled by a signal applied either locally or transmitted to the device from a remote location such as by radio transmission. The control signal is used to control means for first energizing a motor to drive the pump that charges the accumulator. Once the accumulator is charged to at least some predetermined charge, one or more solenoid operated valves will be energized to establish a hydraulic circuit through passageways, ports, fittings, one way valves and related members mostly located on or in the block member to move the switch actuator in a closed direction. The hydraulic fluid pressure established in the accumulator will also pass through associated restrictor or speed control devices which control the amount of pressure applied to the actuator to in turn cause the actuator to move the switch from one operating position to another and at a desired speed. When the subject device is used to cause the hydraulic actuator to close a switching device, a first solenoid control device mounted on the block member will be energized to cause the actuator to commence moving the switch means toward the closed switch condition. This movement usually initially occurs at relatively slow speed, and midway during this movement another solenoid control device for high speed operations is energized and under its control causes the actuator to complete the movement of the switch to its closed condition at high speed. Energizing of the high speed solenoid occurs when a limit switch closes during the movement of the actuator.

When an operator of the present control device is initiated by a suitable signal to cause the actuator to move the switch means toward its open position, a similar process takes place in which the accumulator is charged by the same motor and pump after which an open solenoid control device will be energized to establish a hydraulic circuit for applying hydraulic pressure to the actuator means in a direction to cause the switch device to move to its open condition. An important and unique feature of the present system is that the speed control means, the solenoid control means including the hydraulic connections thereto, the connections to the accumulator and to the pump as well as other hydraulic connections are all embodied in or mounted on the same block member so that the only external hydraulic connections required are connections from the block member to the actuator. This greatly simplifies and reduces the complexity of the hydraulic connections required and substantially reduces the number of exposed parts, fittings and seals needed. Consequently, the present construction has less possibility for trouble due to leakage and vandalism and at the same time provides easy access to all parts and components of the system for service and maintenance. The present construction also reduces the possibility that the subject device will leak or be damaged due to environmental and other conditions. As a consequence, the present system is more reliable than known systems used for the same or similar purposes such as in systems used for opening and closing switches in the high power transmission circuits of public utilities and the like. This enables such circuits to be serviced and maintained safely, and it enables the utility or other user to reroute power under controlled conditions while their equipment is being serviced or worked on for some purpose.

It is therefore a principal object of the present invention to provide a highly reliable hydraulic actuated control system with minimal exposed connections and components.

Another object is to minimize the number of conduits, seals and fittings required in a hydraulic system.

Another object is to increase the reliability of hydraulic actuated switching devices.

Another object is to minimize the possibility for damage to a hydraulic system used to control the operations of a switch or like device due to enviromental, vandalism and other conditions.

Another object is to provide means for up-grading existing hydraulic switch actuated devices using existing mounting and container facilities.

Another object is to teach the construction and operation of novel means for controlling the application of hydraulic pressure to an actuator device used to control the operations of a device such as a switch device during opening and closing thereof.

Another object is to enable the use of a unidirectional motor and associated pump in a hydraulic system capable of controlling movements of an actuator device in both opposite directions thereof.

Another object is to establish a safe condition for servicing and maintaining high voltage electric power transmission equipment.

Another object is to provide a hydraulic actuated device that is relatively easy to service and adjust.

Another object is to enable factory adjusted components to be installed to replace the components of a hydraulic system.

Another object is to reduce the time required for the operation of a hydraulic actuated switching device.

Another object is to minimize the arcing that occurs when switching devices are opened and closed.

These and other objects and advantages of the present invention will become apparent to those skilled in the art after considering the following detail specification in conjunction with the accompanying drawings, wherein:

DETAILED DESCRIPTION OF THE PREFERRED EMBODIMENT

Figure 1:
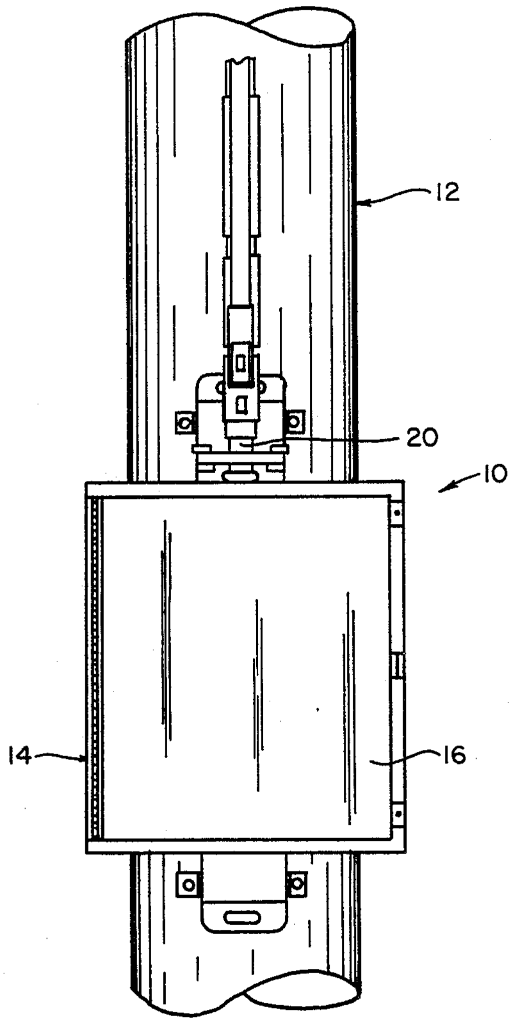
FIG. 1 is a front elevational view of a hydraulic actuated switching device constructed according to the present invention and shown mounted on a utility pole.
Figure 2:
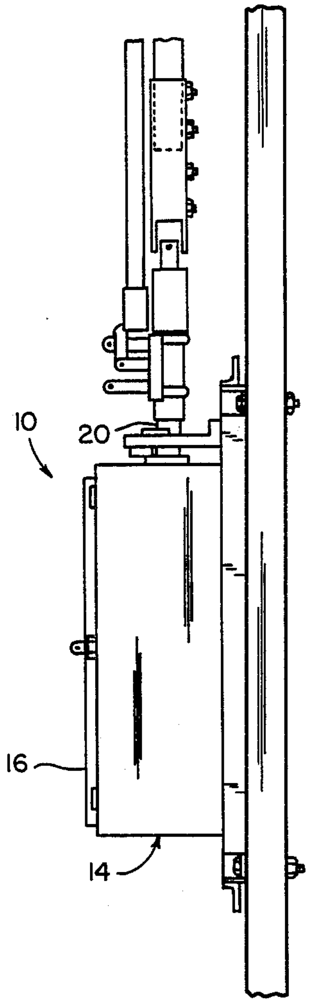
FIG. 2 is a right-side view of the device of FIG. 1.
Figure 3:
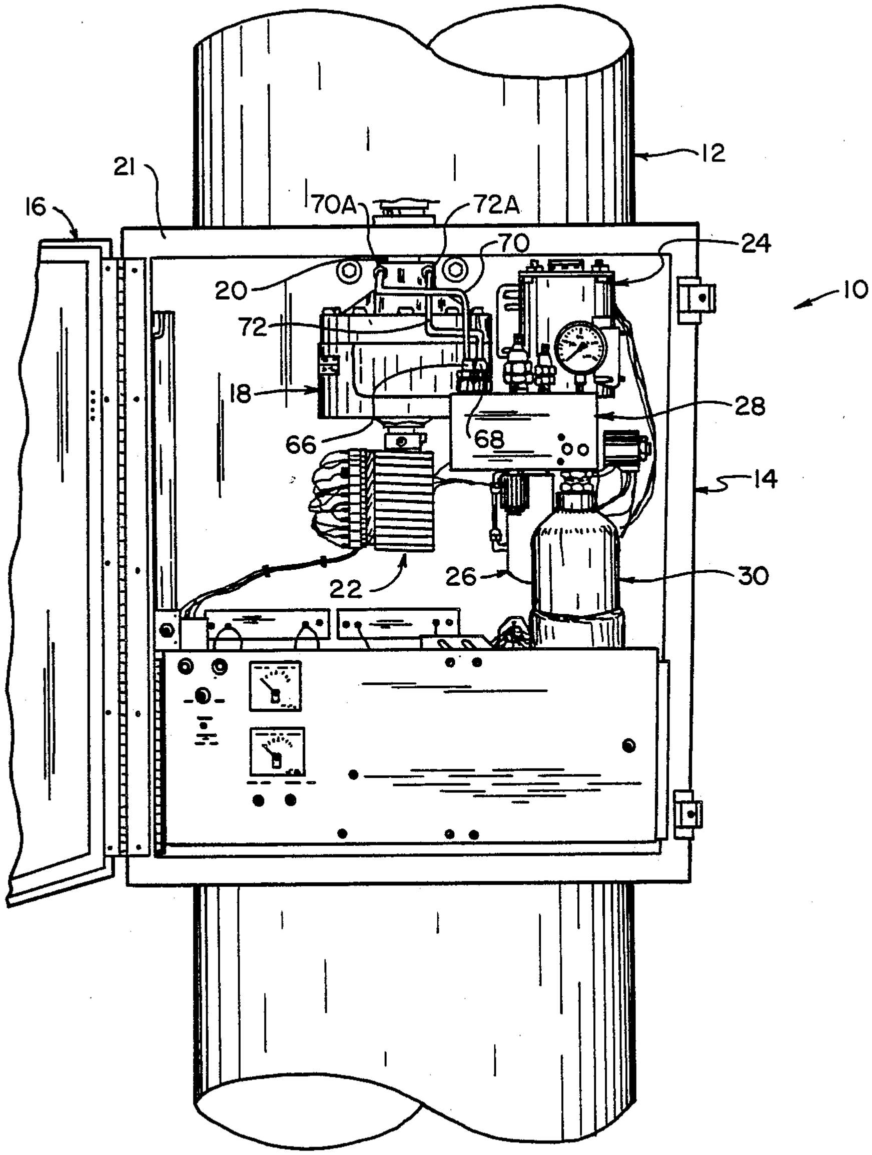
FIG. 3 is a front elevational view of the same device shown with the front panel in an open condition.
Figure 4:
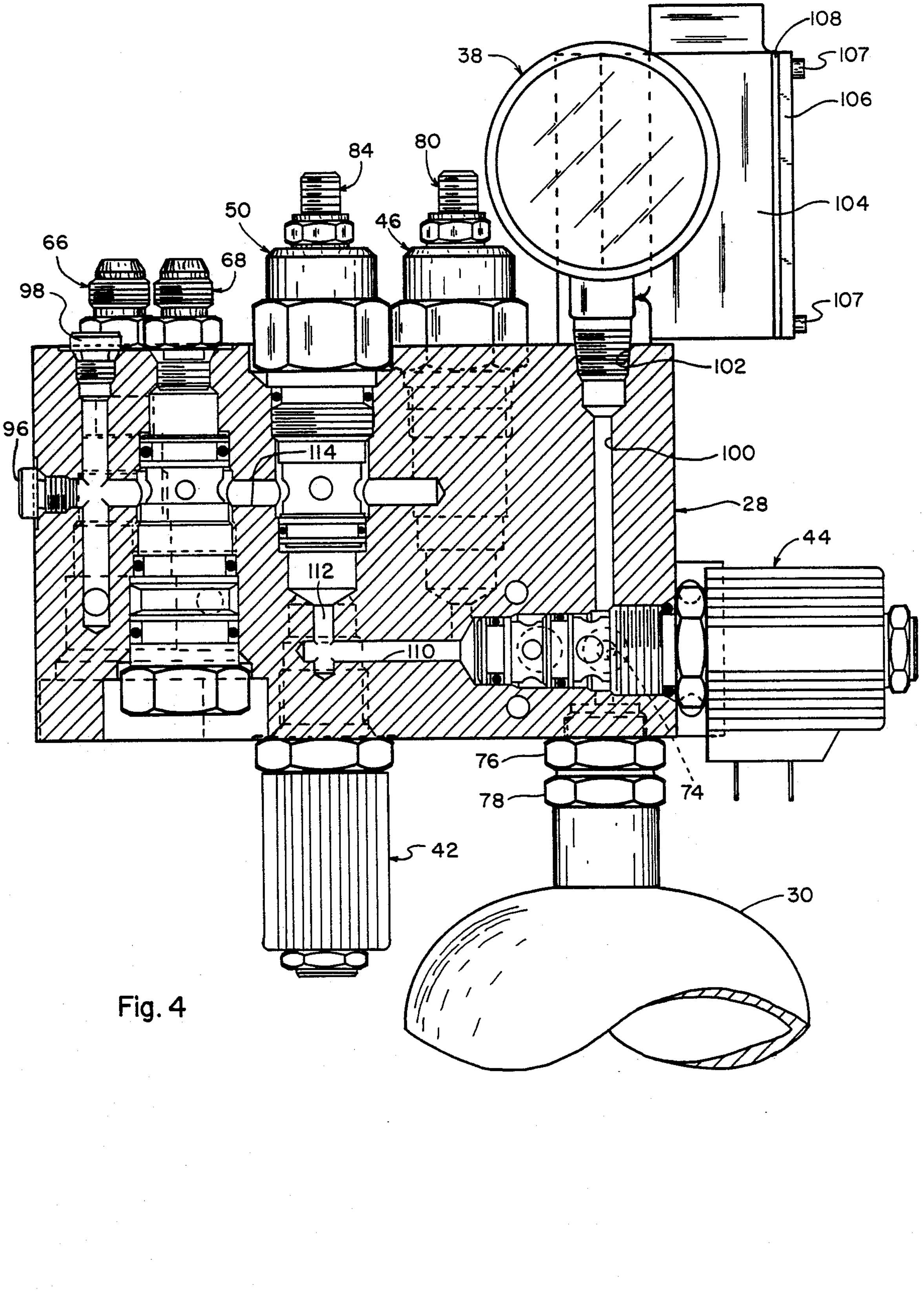
FIG. 4 is a cross-sectional view taken on line 4—4 of FIG. 5.
Figure 5:
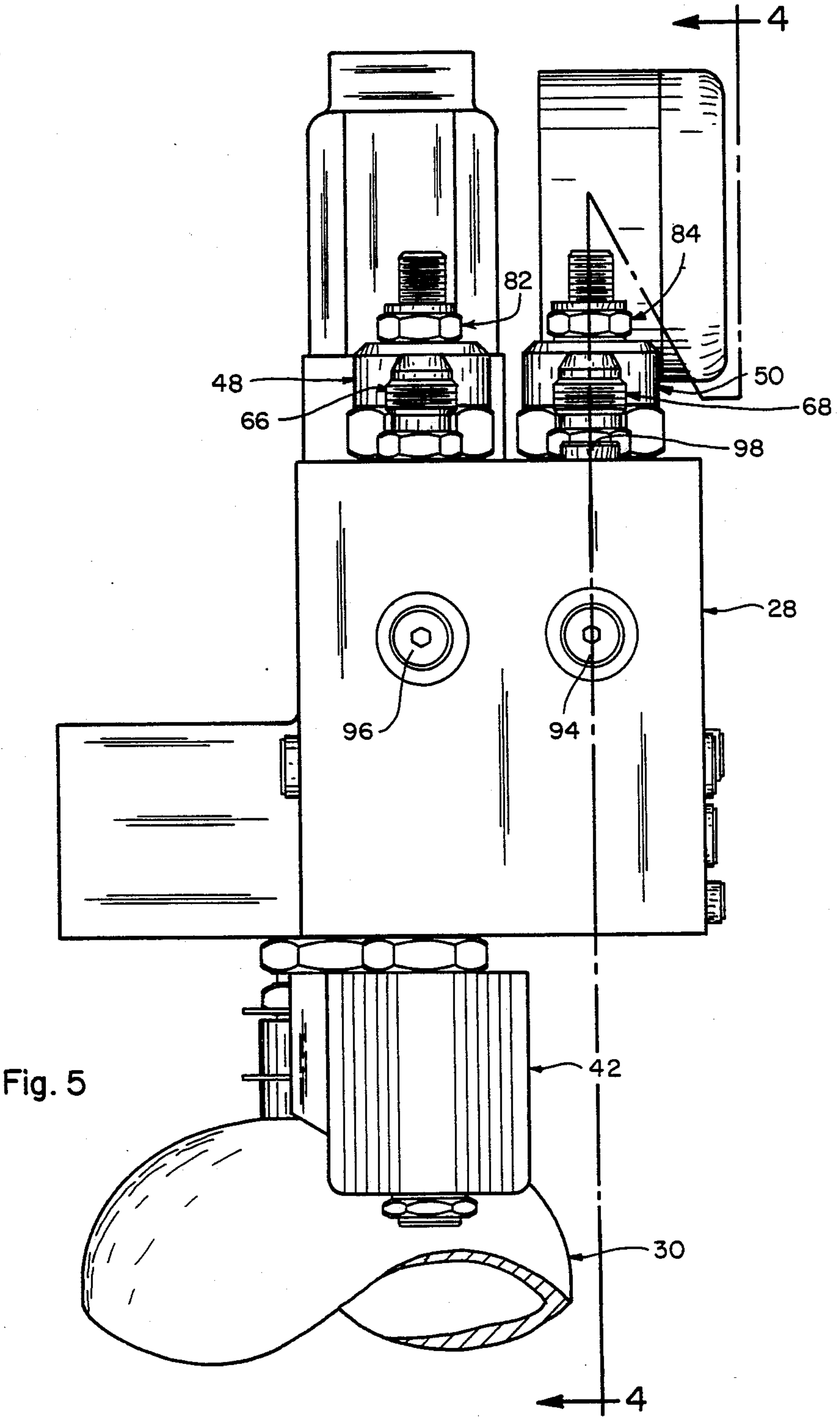
FIG. 5 is a left-side view of the block member of FIG. 4.
Figure 6:
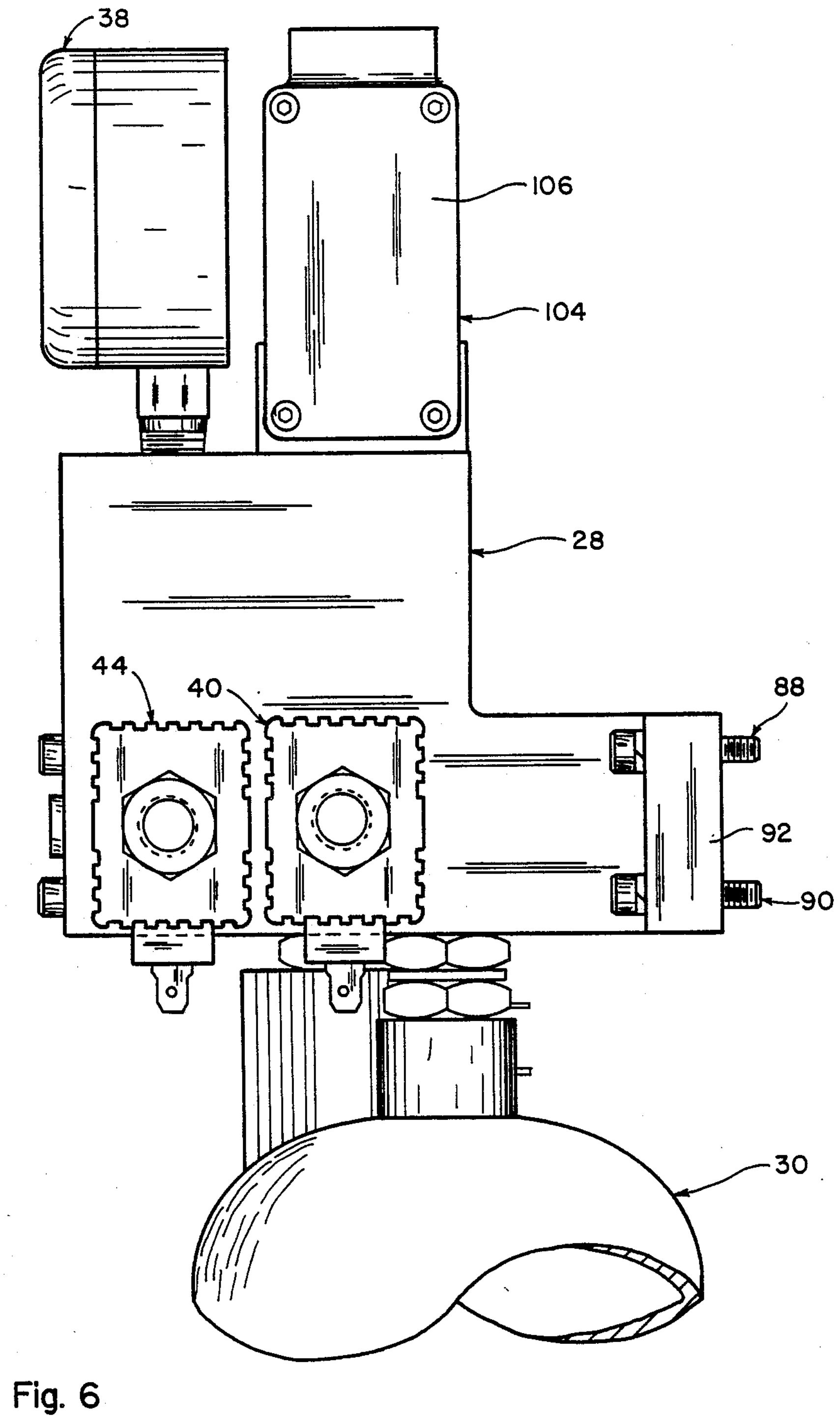
FIG. 6 is a right-side view of the block member of FIG. 4.

Referring to the drawings more particularly by reference numbers, number 10 in FIGS. 1, 2 and 3 refers to a hydraulic system including the housing therefor for operating a switching or like device shown mounted on utility pole 12. The device 10 includes a housing 14 which has a hinged cover plate of panel 16 shown in a closed condition in FIGS. 1 and 2 and in an open condition in FIG. 3. In FIG. 3 the various system mechanisms are shown and include a hydraulic actuator device 18 which is coupled to a switching mechanism thereabove (not shown) by means of an upwardly extending shaft 20 which extends through the upper housing wall 21. The lower end of the shaft 20 extends in the housing 14 from the lower side of the actuator 18, and has provision thereon for mounting a plurality of cam operated switched designated generally by the number 22. To the right of the actuator 18 inside the housing 14 is a motor 24 shown vertically oriented that is operatively connected to drive pump 26. Positioned in the housing 14 in front of the motor 24 and the pump 26 is a block member 28 shown connected to an accumulator 30. The construction of the block member 28 is important to the invention and will be described in detail hereinafter. FIGS. 4, 5 and 6 show details of the block member 28 which is preferably a metal block member that has a plurality of ports, passageways and mounting means arranged therein as well as means to support most of the components of the hydraulic system employed in the present device.

Figure 7:
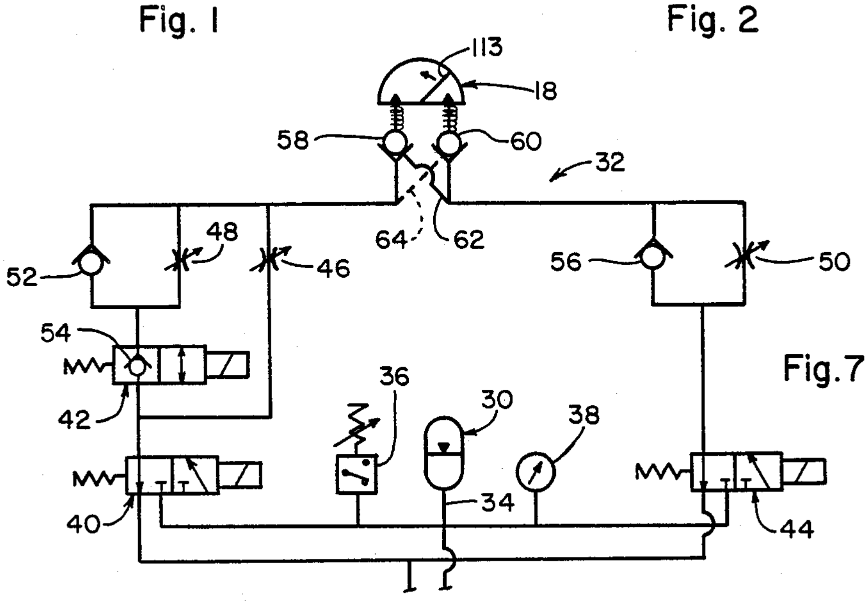
FIG. 7 is a schematic circuit diagram for the hydraulic system of the subject device.

To better understand the construction and operation of the subject device and particularly the construction and operation of the hydraulic system and the block member 28 for the system, reference is made first to FIG. 7 wherein the details and connections of a hydraulic system 32 are shown. The hydraulic system 32 is energized by hydraulic pressure stored in the accumulator 30 which in turn is charged by the pump 26 when driven by the motor 24. When the accumulator 30 is charged it will have established in it a relatively high pressure which is present at its output 34 and which is available for operating the actuator 18 either to close the switch means under control thereof or to open the switch means. During charging of the accumulator 30, a pressure sensitive switch mechanism 36 mounted in a portion of the block member 28 will transfer from one of its operating conductions to another when the pressure at the accumulator output 34 reaches or exceeds some predetermined pressure. The pressure in the accumulator 30 will also be indicated by pressure gauge 38 mounted on the block member 28.

Once the accumulator 30 has been charged sufficiently to transfer the switch 36 to its closed condition, electric power will be applied through circuit means which may be similar to the electric circuit means disclosed in Turner U.S. Pat. No. 4,117,678 to energize a selected solenoid coil and to move its associated valve means to establish a hydraulic connection from the accumulator 30 to the actuator device 18 to move the switch means under control of the actuator in a desired direction depending upon whether the switch is to be closed or opened. The hydraulic system 32 contains and is controlled by three different solenoid valves including a slow speed control solenoid valve 40 which establishes conditions to commence a closing operation of the switch means at slow speed, a high speed solenoid valve 42 which is energized during a switch closing operation to accelerate the speed at which the switch is being closed, and a solenoid control valve 44 which is energized to control the opening of the switch means under control of the same actuator 18. Pressure from the same accumulator 30 is used for all these operations.

The hydraulic system 32 also includes means to limit or restrict the speed of movement of the actuator means under control of the various solenoids. Such means include an adjustable slow speed control restrictor device or valve 46 which is connected in the hydraulic system in series with the slow speed control solenoid valve 40 so that when the solenoid 40 is energized a hydraulic circuit will be established through the solenoid valve means associated therewith and through the slow speed restrictor valve 46 to the actuator 18. Likewise, the hydraulic circuit for the high speed solenoid 42 for controlling the closing of the switch means includes a restrictor device or valve 48 which is in series with and operates in conjunction with the valve portion of the high speed solenoid 42. A third restrictor device or valve, valve 50, is connected in series with the valve means for the open control solenoid 44.

In addition to the elements described above, the hydraulic system 32 is also provided with normally closed one way spring biased valves 52, 54 and 56 connected into the system as shown. The valves 52 and 54 are in respective hydraulic paths used for closing the switch device and are included to provide return flow paths for hydraulic fluid when the open solenoid valve 44 is energized and moves to its open condition. The one way valve 56 provides the same function for the system when the system is operating in one of its switch closing modes.

The hydraulic system has other normally closed spring biased valves 58 and 60 which are connected in the hydraulic lines which operatively connect hydraulic outputs of the block 28 with the actuator 18. Each of the normally closed outlet check valves 58 and 60, sometimes called dual pilot actuated check valves, has a respective high pressure pilot connection 62 and 64.

Referring again to FIG. 3, the block 28 is shown having two outlet fittings 66 and 68 each of which has one of the check valves 58 and 60 included in it. The output fitting 66 is in the hydraulic path used when closing the switch means and the output fitting 68 is in the hydraulic path used when opening the switch means. These fittings are connected respectively to conduits 70 and 72 which have their opposite ends connected respectively to inlet fittings 70A and 72A on the actuator 18.

The block member 28 also has numerous threaded ports and passageways formed in it to accommodate the solenoid assemblies 40, 42 and 44, the restrictor valves 46, 48 and 50, the fittings 66 and 68, an inlet port 74 for connection to the outlet side of the pump 26, and another port with a fitting 76 that connects to fitting means 78 on the accumulator 30. There are also ports used in the making of the block 28 that are plugged. The restrictor devices 46, 48 and 50 may be adjustable needle valves and each has adjustment means such as the means 80, 82 and 84 which can be adjusted using tools such as wrenches, screwdrivers or the like to adjust their needle valves relative to associated seats to establish a desired pressure differential thereacross in order to predeterminably meter the fluid pressure applied therethrough and to the actuator 18. The pressure so applied is applied through passages which include the respective restrictor devices 46, 48 and 50.

One of the important novel features of the present construction resides in the fact the the block member 28 is of one piece construction and has ports and passages formed therein to accommodate the various solenoids, restrictor valves and fittings including the fittings for connection to the outlet from the pump and from the accumulator. In other words with the present construction there is little or no need for external connections including elongated external tubular hydraulic lines or tubes and the like which in known constructions are places of potential trouble and are vulnerable to damage due to environmental conditions, vandalism and other means. By consolidating all or practically all of the hydraulic system including the hydraulic control components, fittings and seals on or in the same unitary structure it is possible to manufacture, adjust and test the entire hydraulic system at the factory and to easily replace components of the system in the field with factory adjusted components. Consequently it is believed that the present system will require relatively little field maintenance and adjustment. This is important especially when it is considered that the subject devices and systems will often be installed in remote locations where the environmental conditions are severe, and where the possibilities for damage, intentional or otherwise, exists. It is also possible as aforesaid to operate the present device remotely by radio transmission or otherwise, or locally, as desired.

The solenoid valves 40, 42 and 44 employed on the present device may be of the same or similar construction and operate similarly, each having a solenoid coil and a movable armature with suitable seals and ports and which are movable between extended deactuated conditions and retracted actuated conditions. When the solenoid coils are de-energized their armatures are in extended conditions and when energized the armatures are moved to their retracted conditions. The solenoids 40 and 44, which are the slow speed close and the open solenoids, will have substantially identical constructions while the high speed close solenoid 42 may be modified somewhat such as by having the normally closed spring biased valve means 54 associated with it for the purpose indicated above.

In like manner the restrictor valves 46, 48 and 50 may all be of similar construction, preferably factory adjusted, but they can also be adjusted in the field if necessary using simple hand tools. They can also be relatively easily field replaced as can the solenoid operated devices simply by unscrewing them for their respective threaded bores in the block member 28. This makes for easy maintenance and adjustment, and it means that factory adjusted parts can be installed to replace defective parts using a simple wrench. Furthermore, the block 28 is preferably rigidly supported in the housing 14 as by mounting bolts 88 and 90 (FIG. 6) which extend through bores in a bracket member 92 on the member 28. By being rigidly mounted in this way it is possible to loosen and tighten the various parts and components mounted on the member 28 without removing the block itself since all of the replaceable elements are readily accessible and all have a hexagonal or like fitting which makes it easy to grip them for tightening or loosening.

In the construction of the block member 28 it is necessary to make some bore portions which may not be needed in the operation of the present hydraulic system 32 in order to form the passages that are required. This is done by drilling into the member 28 and thereafter plugging the unused bore portions using threaded plug members such as plug members 94, 96 and 98 (FIGS. 4 and 5). The plugged and unused passages do not adversely effect the operation.

Referring again to FIG. 4, a passageway 100 is provided with a communicating threaded outlet port 102 which threadedly receives the pressure gauge 38 that provides the operator or service man with a continuous visual indication of the pressure in the system, and particularly the hydraulic pressure available at the outlet of the accumulator 30. This pressure is also applied to the pressure responsive switching device 36 located in the block portion 104. The block portion 104 is sealably closed by panel 106, sealing gasket 108 and fasteners 107 which can be removed for servicing. Suitable electrical connections are also made to the pressure responsive switch 36 for connecting the switch into the circuit used for energization of the various solenoids. The electrical circuits for the subject device may be similar to those disclosed in Turner U.S. Pat. No. 4,117,678 and are not part of the present invention. To the extent necessary to understand this invention the operation of the electric circuits will be described hereinafter.

FIG. 4 also shows most of the hydraulic connections associated with the open solenoid valve 44 including the connection to the outlet side of the accumulator 30, see also FIG. 7. The opposite side of the solenoid valve 44 from the accumulator is connected to one side of the restrictor device 50 which is connected thereto by passages 110 and 112. The opposite side of the restrictor device 50 is in turn connected to one side of the normally closed spring loaded one way valve 60 associated with the fitting 68. When the coil for the open solenoid valve 44 is energized to open the solenoid valve the pressure from the accumulator 30 will be applied to and through the restrictor valve 50 which acts to predeterminately limit the pressure applied therethrough, and to and through the normally closed one way valve 60 to one side of the actuator 18 to cause the movable actuator member 113 to move from its closed toward its open position. The outlet side of the restrictor device 50 is connected by way of port 114 to the inlet side of the fitting 68 associated with the normally closed one way valve 60. The fitting 68 is also connected to one end of the hydraulic tube 72 which has its opposite end connected to the actuator 18.

Similar hydraulic circuits are also produced under control of the solenoid 40 for the slow speed switch close operation. However, as explained above in the case of a switch close operation there is provided a second solenoid 42, which is the high speed control solenoid that is energized midway during a closing operation to complete the closing operation but at a higher speed. The hydraulic circuits for the switch close operations are likewise substantially contained within the block member 28 but in the rear rather than in the front portions thereof. To some extent the components for the closing of the switch passages are shown in dotted outline in FIG. 4.

The restrictor devices 46, 48 and 50 may all be needle valve devices which include pointed needle members (not shown) that cooperate with adjacent valve seats and are adjustable to predeterminately restrict communication therethrough. The closer the needle valve members are adjusted to their respective seats the more restricted and hence the greater will be the pressure drop thereacross and vice versa.

The one way valves 52, 54 and 56 include valve seats against which ball valve members are spring biased to allow flow thereby in one direction only. Such devices permit relatively easy flow in one direction, depending upon the strength of the springs used while substantially restricting or preventing flow therethrough altogether in the opposite direction. However, some restricted back flow is provided through the one way valves 58 and 60 as aforesaid to facilitate operation. The restricted back flow provided for the valve 58 and 60 is to enable a restricted return flow path thereby.

It is apparent that the present construction represents an important advance over the prior art in the construction of hydraulically operated switching devices, and one which fulfills all of the objects and advantages sought therefor. It will be apparent to those skilled in the art, however, that many changes, modifications, variations and other uses and applications for subject devices are possible, and all such changes, modifications, variations and other uses and applications which do not depart from the spirit and scope of the invention are deemed to be covered by the invention which is limited only by the claims which follow.

What is claimed is:

1. Hydraulic switch actuated control means comprising a hydraulic actuator assembly having a housing with a member movable therein between a first position and a second position in response to the application of hydraulic pressure into the actuator housing on opposite sides of the movable member, said actuator housing having a first inlet for introducing hydraulic pressure therein to move the movable member from the first to the second position thereof and a second inlet for alternatively introducing hydraulic pressure therein to move the movable member from the second to the first position thereof, a source of hydraulic fluid under pressure and means for selectively applying pressure from said source to the first and second actuator inlets, the improvements including, a one piece multi-sided block member having opposed pairs of side faces, a main inlet port in one side face communicating with the source of hydraulic fluid, a pair of outlet ports in another face and first and second separate sets of connecting passageways in said block extending between the inlet and each outlet port of said pair, all of the passageways of said first and second sets extending into the block and formed by passage portions extending substantially normal to respective block faces, the first set of connecting passageways in the block including angularly related communicating passages including a first passageway extending into the block in communication with the inlet port, communicating second and third passageways extending between and communicating the first passageway with one of the pair of outlet ports, solenoid operated valve means associated with the first passageway to control communication between the inlet port and said one outlet port, means associated with the second passageway adjustable to predeterminately limit communication between the inlet port and said one outlet port, the second set of connecting passageways in the block including angularly related communicating passages extending between the inlet port and the other of said outlet ports, said second set of passageways including a first passageway extending into the block in communication with the inlet port, and parallel connected second and third passageways in the block communicating the first passageway of said second set with the other outlet port, solenoid operated valve means associated with the first passageway of said second set to control communication between the inlet port and said other outlet port, means associated with said parallel second passageway of the second set adjustable to predeterminately limit communication between the inlet port and the other outlet port, the parallel connected third passageway in the block including associated solenoid operated valve means to control communication therethrough and other means in said parallel connected third passageway adjustable to predeterminately limit communication therethrough.

2. The hydraulic switch actuated control means of claim 1 including means associated with the respective first and second sets of passageways between the inlet port and the respective first and second actuator inlets forming first and second respective relatively restricted return hydraulic paths.

3. The hydraulic switch actuated control means of claim 1 including a pressure gauge mounted on the block member and means communicating the gauge with the hydraulic pressure at the inlet port.

4. The hydraulic switch actuated control means of claim 1 wherein the source of hydraulic pressure includes a motor, a pump operatively connected to be driven by the motor, said pump having an outlet communicating with a inlet port on the block member, a hydraulic pressure accumulator connected to the block member, and means to establish communication between the inlet port and the accumulator whereby the accumulator is charged by the pump.

5. The hydraulic switch actuated control means of claim 4 including hydraulic pressure actuated switch means and means communicating the switch means with the pressure established in the accumulator, said switch means being movable between a first position when the hydraulic pressure in the accumulator is below a predetermined pressure and a second position when the hydraulic pressure in the accumulator is above the predetermined hydraulic pressure.

6. Means including a block member for hydraulically operating a switching device having first and second operating positions, the hydraulic system including a hydraulic actuator having a chamber for hydraulic fluid and a member operatively connected to the switching device and movable in the chamber between the first position corresponding to the first position of the switching device and a second position corresponding to the second position of the switching device, said movable member dividing the chamber into separate chamber portions on opposite sides thereof, said actuator having a first inlet communicating with the chamber on one side of the movable member and a second inlet communicating with the chamber on the opposite side of the movable member, the improvements comprising a one piece multi-sided block member having an inlet port in one face, a pair of outlet ports in another face and first and second separate sets of connecting passageways in said block member extending between the inlet and each outlet port of said pair, all of the passageways of said first and second sets extending into the block member and formed by passage portions extending substantially normal to respective block faces, means connecting the outlet ports of the pair respectively to the first and second inlets of the hydraulic actuator, the first set of connecting passageways in the block including angularly related communicating passages including a first passageway extending into the block in communication with the inlet port, communicating second and third passageways extending between and communicating the first passageway with one of the pair of outlet ports, solenoid operated valve means associated with the first passageway to control communication between the inlet port and said one outlet port, means associated with the second passageway adjustable to predeterminately limit communication between the inlet port and said one outlet port, the second set of connecting passageways in the block including angularly related communicating passages extending between the inlet port and the other of said outlet ports, said second set of passageways including a first passageway extending into the block in communication with the inlet port, and parallel connected second and third passageways in the block communicating the first passageway of said second set with the other outlet port, solenoid operated valve means associated with the first passageway of said second set to control communication between the inlet port and said other outlet port, means associated with said parallel second passageway of the second set adjustable to predeterminately limit communication between the inlet port and the other outlet port, the parallel connected third passageway in the block including associated solenoid operated valve means to control communication therethrough and other means in said parallel connected third passageway adjustable to predeterminately limit communication therethrough.

7. The means defined in claim 6 wherein the source of hydraulic pressure includes motor driven pump means and an accumulator, said accumulator being connected to the block member and having an accumulator output communicating with the inlet port.

8. The means defined in claim 9 including means mounted on the block member for indicating the hydraulic pressure at the inlet port.

9. The means defined in claim 9 including pressure actuated switch means and means communicating the pressure actuated switch means to the inlet port to respond to the hydraulic pressures thereat, said pressure actuated switch means being movable between a first position when the hydraulic pressure at the inlet port is less than a predetermined pressure and a second position when the hydraulic pressure at the inlet port is greater than said predetermined pressure.

10. The means defined in claim 6 including a housing and means therein for mounting the hydraulic actuator, the block member, and the components mounted on the block member therein.

11. The means defined in claim 6 including dual pilot-actuated check valve means in the paths between the first and second inlets to the actuator and respective outlets of the block member.

12. In a hydraulic switch actuated control apparatus having a hydraulic actuator assembly including a housing with a member movable therein between a first position and a second position in response to the application of hydraulic pressure into the actuator housing on opposite sides of the movable member, said actuator housing having a first inlet for introducing hydraulic pressure therein to move the movable member from the first to the second position thereof and a second inlet for alternatively introducing hydraulic pressure therein to move the movable member from the second to the first position thereof, a source of hydraulic fluid under pressure and means for selectively applying pressure from said source to the first and second actuator housing inlets, the improvement comprising a one piece multi-sided block member having an inlet port in one face, a pair of outlet ports in another face and first and second separate sets of connecting passageways in said block member extending between the inlet and each outlet port of said pair, all of the passageways of said first and second sets extending into the block member and formed by passage portions extending substantially normal to respective block faces, means connecting the outlet ports of the pair to the respective first and second inlets to the hydraulic actuator assembly, the first set of connecting passageways in the block member including angularly related communicating passages including a first passageway extending into the block member in communication with the inlet port, communicating second and third passageways extending between and communicating the first passageway with one of the pair of outlet ports, solenoid operated valve means associated with the first passageway to control communication between the inlet port and said one outlet port, means associated with the second passageway adjustable to predeterminately limit communication between the inlet port and said one outlet port, the second set of connecting passageways in the block including angularly related communicating passages extending between the inlet port and the other of said outlet ports, said second set of passageways including a first passageway extending into the block in communication with the inlet port, and parallel connected second and third passageways in the block communicating the first passageway of said second set with the other outlet port, solenoid operated valve means associated with the first passageway of said second set to control communication between the inlet port and said other outlet port, means associated with said parallel second passageway of the second set adjustable to predeterminately limit communication between the inlet port and the other outlet port, the parallel connected third passageway in the block including associated solenoid operated valve means to control communication therethrough and other means in said parallel connected third passageway adjustable to predeterminately limit communication therethrough.

13. In the hydraulic switch actuated control apparatus of claim 12 the further improvement of means adjustable to limit the magnitude of hydraulic pressure said means including a needle valve.

14. A one piece multi-sided block having an inlet port in one face, a pair of outlet ports in another face and first and second separate sets of connecting passageways in said block extending between the inlet and each outlet port of said pair, all of the passageways of said first and second sets extending into the block and formed by passage portions extending substantially normal to respective block faces, the first set of connecting passageways in the block including angularly related communicating passages including a first passageway extending into the block in communication with the inlet port, communicating second and third passageways extending between and communicating the first passageway with one of the pair of outlet ports, solenoid operated valve means associated with the first passageway to control communication between the inlet port and said one outlet port, means associated with the second passageway adjustable to predeterminately limit communication between the inlet port and said one outlet port, the second set of connecting passageways in the block including angularly related communicating passages extending between the inlet port and the other of said outlet ports, said second set of passageways including a first passageway extending into the block in communication with the inlet port, and parallel connected second and third passageways in the block communicating the first passageway of said second set with the other outlet port, solenoid operated valve means associated with the first passageway of said second set to control communication between the inlet port and said other outlet port, means associated with said parallel second passageway of the second set adjustable to predeterminately limit communication between the inlet port and the other outlet port, the parallel connected third passageway in the block including associated solenoid operated valve means to control communication therethrough and other means in said parallel connected third passageway adjustable to predeterminately limit communication therethrough.

* * * * *

UNITED STATES PATENT AND TRADEMARK OFFICE
CERTIFICATE OF CORRECTION

PATENT NO. : 4,894,988

DATED : January 23, 1990

INVENTOR(S) : Albert J. Hoppenjans

It is certified that error appears in the above-identified patent and that said Letters Patent is hereby corrected as shown below:

Column 1, line 41, "then" should be --than--.

Column 4, lune 19, "switched" should be --switches--.

Column 4, line 49, "conductions" should be --conditions--.

Column 6, line 4, the first occurrence of "the" should be --that--.

Column 10, line 51, "9" should be --6--.

Column 10, line 54, "9" should be --6--.

Signed and Sealed this

Eleventh Day of December, 1990

*Attest:*

HARRY F. MANBECK, JR.

*Attesting Officer*

*Commissioner of Patents and Trademarks*